April 14, 1936.    O. S. FARRAR    2,037,222
AUTOMATIC DUMPING WHEELBARROW
Filed Sept. 3, 1935    2 Sheets-Sheet 1

Inventor
O. S. Farrar
By Lester L. Sargent
Attorney

April 14, 1936.  O. S. FARRAR  2,037,222

AUTOMATIC DUMPING WHEELBARROW

Filed Sept. 3, 1935  2 Sheets-Sheet 2

Inventor
O. S. Farrar
By Lester L. Sargent
Attorney

Patented Apr. 14, 1936

2,037,222

UNITED STATES PATENT OFFICE 2,037,222

AUTOMATIC DUMPING WHEELBARROW

Ogden S. Farrar, Statesville, N. C.

Application September 3, 1935, Serial No. 39,013

3 Claims. (Cl. 298—3)

The object of my invention is to provide a novel wheelbarrow having novel means for easily dumping the wheelbarrow when a load is to be discharged, and to provide the novel combination and arrangement of parts illustrated. I attain these and other objects of my invention by the mechanism illustrated in the accompanying drawings, in which—

Like numerals designate like parts in each of the several views.

Figure 1:
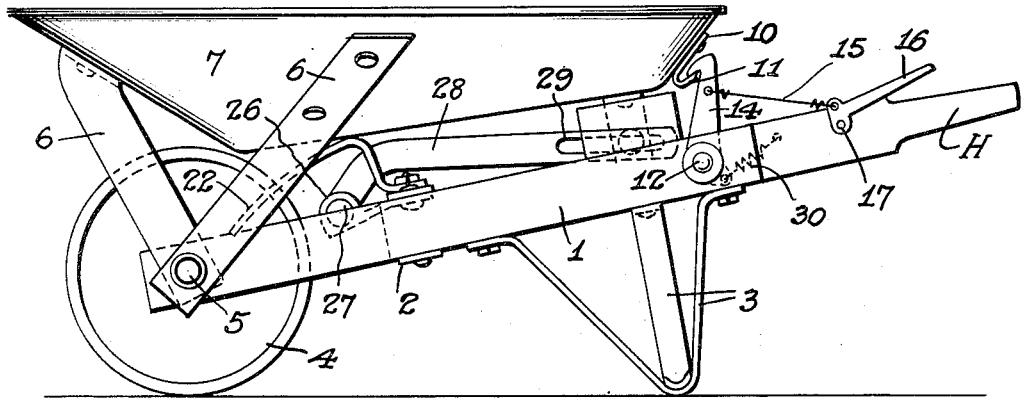
Figure 1 is a side elevation of my invention in position for carrying a load.

Referring to the accompanying drawings, I utilize the usual barrow supporting bars 1, a cross bar 2, affixed to and bracing bars 1, legs 3 on bars 1, a wheel 4 and axle 5, mounted in the forward ends of bars 1. The barrow 7 has brace bars 6 affixed to its forward end, said brace bars being pivotally mounted on the axle 5. At the rear end of the barrow is a bracket 8 affixed to its underside and carrying a bolt 9 which is slidable in the slot 29 of the elevating or dumping bar 28.

Figure 3:
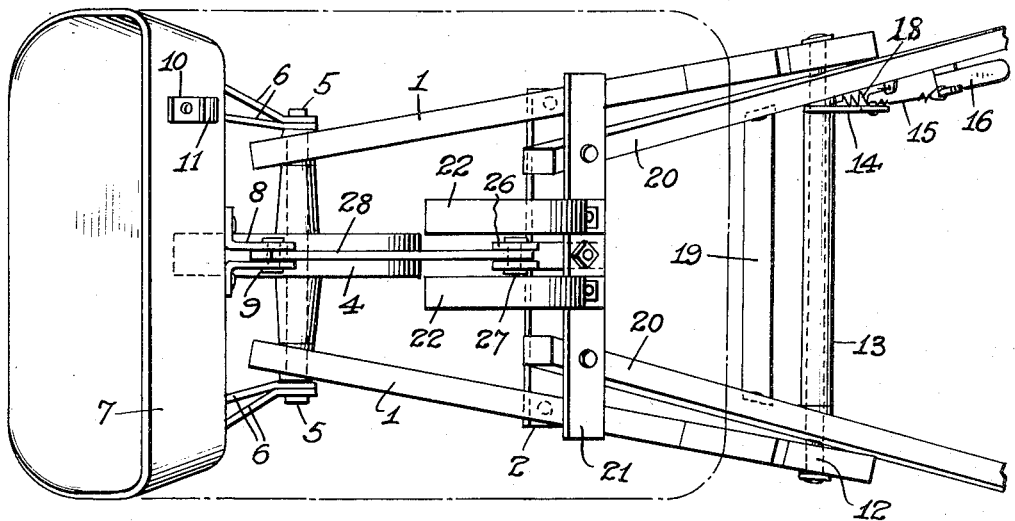
Fig. 3 is a top plan view of the invention when in the dumping position shown in side elevation in Fig. 2.
Figure 4:
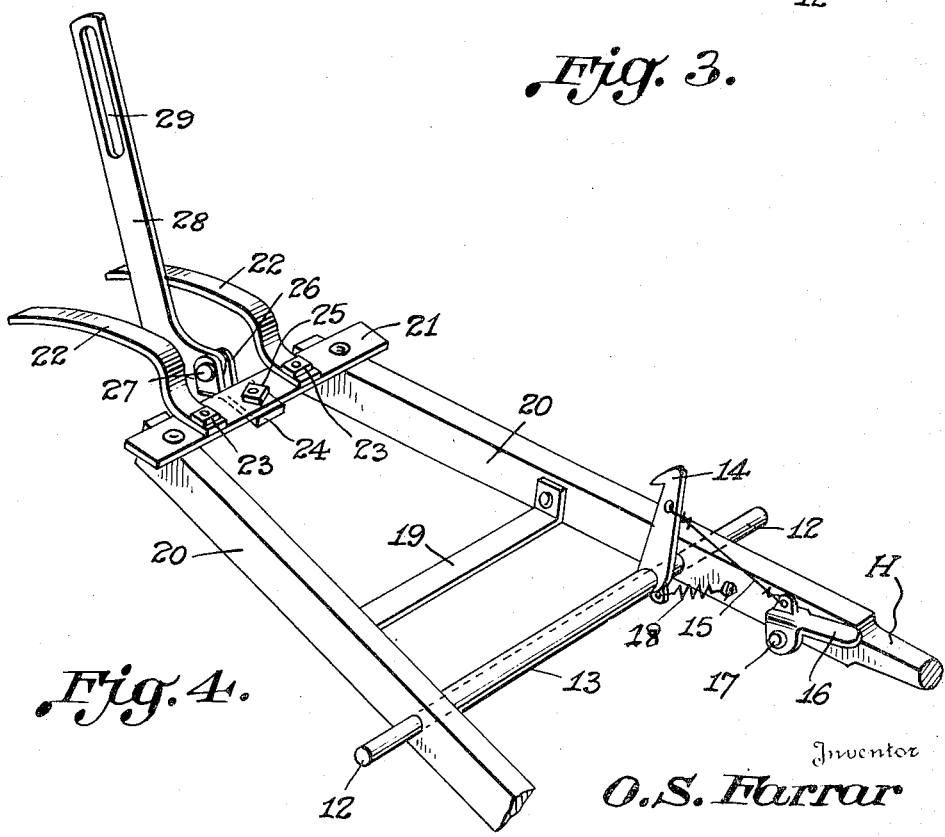
Fig. 4 is a perspective view of the dumping mechanism removed from the barrow supporting frame.

Affixed to the rear end of barrow 7, I provide a latch bar 10, terminating in the hook end 11. I provide a cross bar 12, mounted in the ends of barrow supporting bars 1, as shown in Fig. 3. Mounted on cross bar 12 is a sleeve 13, on which is mounted or integrally formed the latch 14, which is detachably engageable with the hook end 11 of bar 10. I provide a suitable length of cable 15 operatively connecting latch 14 with the manually operated trigger 16. Trigger 16 is pivotally mounted at 17 on one of the bars 20 as shown in Fig. 4. I provide any suitable latch spring secured to latch 14 and releasably holding said latch in operative engagement and the level of latch bar 10, as shown in Fig. 1.

Figure 2:
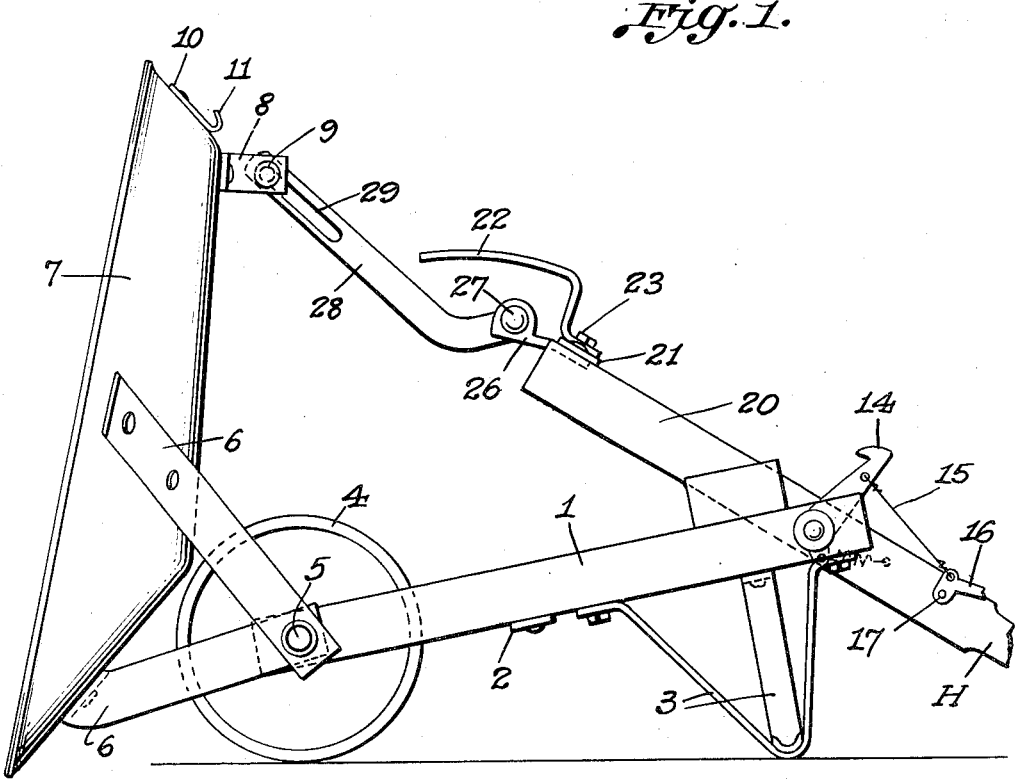
Fig. 2 is a side elevation of my invention in dumping position, a portion of the handles being broken away for lack of space.

As shown in Fig. 4 I provide a cross brace 19, affixed to and bracing the barrow lift bars 20. The forward ends of bars 20 are braced by a cross bar 21, to which are affixed the barrow dumping members, which may be the plates 22, (or suitably mounted rollers occupying a similar position and performing a similar function). Plates 22 are fastened to bars 21 by suitable means such as bolts 23. Fastened to bar 21 by suitable means, such as plate 25, is a bracket 24 which has slightly upturned flanges or ears 26. A barrow elevating bar 28 is pivotally mounted on the ears 26 by the pivot or bolt member 27. Bar 28 has a longitudinal slot 29, as shown in Fig. 4, slidably attaching the bar 28 to the bracket 8 by the bolt 9, as shown in Fig. 2.

In ordinary use the barrow 7 is latched in horizontal position on the supporting bars 1 by the latch 14 which engages the latch bar 10, as shown in Fig. 1. When it is desired to dump the load in the barrow the operator presses on the trigger 16, thus releasing the latch 14 from its engagement with the latch bar 10 and pressing down on the handles H of the barrow lift bars 20. Those bars are tilted so that the handles are near the ground and the forward ends of the bars in raised position. The plates 22 press on the bottom of the barrow and swing it upwardly to an approximately vertical and dumping position, and the bar 28 pivots on the upturned ears 26 or bracket 24. The bolt 9 on bracket 8 engaging the slotted portion 29 of the link or dumping bar 29 permits the barrow to swing to the extreme and nearly vertical dumping position shown in Fig. 2 of the drawings. The supporting bars 26 are pivotally supported on the axle 5 so as to permit the necessary swinging movement of the barrow to move from an approximately horizontal to an approximately vertical dumping position.

What I claim is:—

1. In a dumping wheelbarrow of the type described, the combination of a wheel and axle, barrow supporting bars and legs, barrow, brace bars affixed to the barrow and pivotally mounted on the axle, and a dumping mechanism comprising barrow lift bars pivotally mounted on the barrow supporting bars, barrow dumping members contacting with the bottom of the barrow and carried by the barrow, lift bars for pressing on the bottom of the barrow to raise the rear end thereof to a dumping position, a bracket carried by the barrow lift bars, a link bar pivotally connected to said bracket, a bracket on the barrow, and a slidable connection between said bracket and said link bar.

2. In a dumping wheelbarrow of the type described, the combination of a wheel and axle, barrow supporting bars and legs, barrow, brace bars affixed to the barrow and pivotally mounted on the axle, and a dumping mechanism comprising barrow lift bars pivotally mounted on the barrow supporting bars, a latch releasably latching the barrow in loading position, a cross bar on the barrow lift bars, curved plates mounted on said cross bar and contacting with the bottom of the barrow for raising same to a dumping position, a bracket carried by the barrow lift bars, a link bar pivotally connected to said bracket, a second bracket on the barrow, and a slidable connection between said bracket and said link bar.

3. A dumping wheelbarrow having a barrow and conventional barrow supporting bars, means for pivotally mounting the forward end of the barrow, a latch releasably latching the barrow in a normal horizontal position, barrow dumping means engaging the bottom of the barrow and mounted on the forward end of the barrow lift bars to raise the rear end of the barrow to a dumping position when the handles of the lift bar are depressed, a bracket carried by the barrow lift bars, a link bar pivotally connected to said bracket, a bracket on the wheelbarrow the link bar having a longitudinal slide at its forward end, and a slidable connection between said slotted portion of the link bar and the bracket on the barrow.

OGDEN S. FARRAR.